(12) United States Patent
Tucker et al.

(10) Patent No.: US 8,149,262 B2
(45) Date of Patent: Apr. 3, 2012

(54) NETWORK MANAGEMENT SERVER FOR MANAGING MULTIPLE OPERATING MODES OF A CONFERENCING NETWORK WITH DIFFERENT SETS OF POLICIES

(75) Inventors: Richard W. Tucker, Lancaster, VA (US); Gregory J. McGreevy, Great Falls, VA (US); Joseph A. Sorenson, Coon Rapids, MN (US); Timothy J. Ebben, Spring Park, MN (US); Kevin A. Job, Monticello, MN (US); Jan M. Timmer, Ashburn, VA (US); Sergio Jason Delhoyo, Leesburg, VA (US); John E. McGreevy, McLean, VA (US)

(73) Assignee: Freeport Technologies, Herndon, VA (US)

( * ) Notice: Subject to any disclaimer, the term of this patent is extended or adjusted under 35 U.S.C. 154(b) by 1036 days.

(21) Appl. No.: 12/061,451

(22) Filed: Apr. 2, 2008

(65) Prior Publication Data
US 2009/0251529 A1 Oct. 8, 2009

(51) Int. Cl.
*H04M 11/00* (2006.01)
(52) U.S. Cl. .................. 348/14.09; 348/14.08
(58) Field of Classification Search ............... 348/14.09, 348/14.08; 370/260
See application file for complete search history.

(56) References Cited

U.S. PATENT DOCUMENTS

| | | | |
|---|---|---|---|
| 4,477,809 A | 10/1984 | Bose | |
| 5,867,494 A | 2/1999 | Krishnaswamy et al. | |
| 5,867,495 A | 2/1999 | Elliott et al. | |
| 5,999,525 A | 12/1999 | Krishnaswamy et al. | |
| 6,266,782 B1 | 7/2001 | Carter et al. | |
| 6,335,927 B1 | 1/2002 | Elliott et al. | |
| 6,404,746 B1 | 6/2002 | Cave | |
| 6,430,699 B1 | 8/2002 | Carter et al. | |
| 6,731,625 B1 | 5/2004 | Eastep et al. | |
| 6,732,177 B1 | 5/2004 | Roy | |
| 6,754,181 B1 | 6/2004 | Elliott et al. | |
| 6,775,255 B1 | 8/2004 | Roy | |
| 6,810,116 B1 | 10/2004 | Sorensen | |
| 6,859,448 B1 | 2/2005 | Roy | |
| 6,909,708 B1 | 6/2005 | Krishnaswamy et al. | |
| 6,967,941 B2 | 11/2005 | Roy | |
| 6,996,094 B2 | 2/2006 | Cave et al. | |
| 7,009,943 B2 | 3/2006 | O'Neil | |

(Continued)

OTHER PUBLICATIONS

Polycom, Inc., "Path Navigator User Guide" P/N 3725-200335-001 (Oct. 2004).

(Continued)

*Primary Examiner* — Stella Woo
(74) *Attorney, Agent, or Firm* — Locke Lord LLP

(57) ABSTRACT

A method, system, and computer program product are disclosed to manage multiple operating modes in a video conferencing network under which different sets of policies can operate. The system is a network management server, also referred to herein as the ELASTIC GATEKEEPER™, that includes a Conference Management System, which selectively implements one or more different sets of operating policies. The Conference Management System is integrated and linked with a gatekeeper, which is responsible for setting up calls that are using end point alias addresses. The gatekeeper works with the Conference Management System to control access to network resources. Upon receiving a request to access a call, the gatekeeper passes the request to the Conference Management System for its approval. The Conference Management System has access to a robust set of policies, a detailed description of the network resources, and an awareness of the current System Operational Mode upon which to base a decision about the conditions and resources that can be granted to the requested call.

31 Claims, 8 Drawing Sheets

U.S. PATENT DOCUMENTS

| | | |
|---|---|---|
| 7,035,252 B2 | 4/2006 | Cave et al. |
| 7,145,898 B1 | 12/2006 | Elliott |
| 7,593,032 B2 | 9/2009 | Civanlar et al. |
| 7,738,492 B2 | 6/2010 | Lauwers et al. |
| 2001/0005372 A1 | 6/2001 | Cave et al. |
| 2001/0005382 A1 | 6/2001 | Cave et al. |
| 2002/0018476 A1 | 2/2002 | Roy |
| 2002/0019956 A1 | 2/2002 | Carter et al. |
| 2002/0064136 A1 | 5/2002 | O'Neil |
| 2002/0064149 A1 | 5/2002 | Elliott et al. |
| 2002/0075844 A1 | 6/2002 | Hagen |
| 2002/0085490 A1 | 7/2002 | O'Neil |
| 2003/0028535 A1 | 2/2003 | Sheldon et al. |
| 2004/0103151 A1 | 5/2004 | Ettinger et al. |
| 2004/0170263 A1 | 9/2004 | Michael et al. |
| 2004/0179092 A1 | 9/2004 | LaPoint |
| 2005/0250491 A1 | 11/2005 | Roy |
| 2005/0254440 A1 | 11/2005 | Sorrell |
| 2006/0182130 A1 | 8/2006 | Even et al. |
| 2007/0019635 A1 | 1/2007 | McMenamy |
| 2007/0030824 A1 | 2/2007 | Ribaudo et al. |

OTHER PUBLICATIONS

Dhesikan, "Quality of Service for IP Videoconferencing Engineering White Paper," Cisco Systems, Inc., Jun. 1, 2001.

Riverbend Software Solutions, Reliance™ Video system Management Software, 7.0 Reservation Manager User Guide, 2004.

International Search Report for PCT/US2008/082609 issued on May 13, 2009.

Chapter 29-1 "Multilevel Precedence and Preemption" in the publication Cisco Unified Communications Manager Features and Services Guide for Cisco Unified Communications Manager Business Edition , Publication No. OL-18613-01, dated May 12, 2009.

FLOW DIAGRAM OF
NETWORK MANAGEMENT SERVER
OPERATION

FLOW DIAGRAM OF
NETWORK MANAGEMENT SERVER
OPERATION

NETWORK MANAGEMENT SERVER FOR MANAGING MULTIPLE OPERATING MODES OF A CONFERENCING NETWORK WITH DIFFERENT SETS OF POLICIES

FIELD

The technical field relates to managing conferencing networks and more particularly relates to managing multiple operating modes in a video conferencing network under which different sets of policies can operate.

BACKGROUND

In videoconferencing, people at two or more geographic locations can conduct a meeting with simultaneous, two-way video and audio transmissions. The videoconference can be as uncomplicated as point-to-point communication between two people in private offices or it can be more elaborate multipoint communication using a Multipoint Control Unit (MCU) bridge that interconnects calls from several geographic locations, with groups of participants in large rooms especially equipped for videoconferencing. Such conferences can, in addition, be used to share documents, computer-displayed information, and whiteboards.

Organizations such as corporations and governments at the city, state, and national levels use elaborate videoconferencing networks to conduct their meetings and operations, both within the organization and with other organizations. The networks typically interconnect end points, which can range from a limited bandwidth desktop PC connected through the Internet, to elaborate videoconference rooms designed for high quality-of-service communication and equipped with high definition displays requiring a high bandwidth. The networks, themselves can be leased or owned, and can range from packet switched Internet links to dedicated, circuit switched trunks that may include international links through undersea fiber optical cables or leased transponders of a communications satellite.

Because members of an organization may wish to conduct multiple videoconferencing sessions simultaneously, centralized scheduling servers must be used to allocate the finite available bandwidth of the network's segments and to allocate the conferencing end points among the requesting videoconferencing sessions.

However, the preferential allocation of network resources has not been addressed or solved for requesting ad hoc videoconferencing sessions under conditions of emergency, stress, or disaster. For example, an international petroleum corporation conducts exploration, drilling, extraction, refining, and marketing operations for petroleum. The corporation uses dedicated, circuit switched trunks that include leased satellite transponders to conduct videoconferencing meetings between their various land-based operations, their fleet of oil tankers at sea, their mid-ocean oil drilling platforms, and their land-based operations on other continents. In the event of a storm or fire on an oil drilling platform, urgent, ad hoc conferences need to be conducted regarding the preservation of lives and property. Some way needs to be available to preferentially allocate network resources for such urgent, ad hoc conferences without completely disrupting existing scheduled conferences. As another example, the corporation provides WiFi-connected, laptop computers used by construction contractors at their gulf-coast oil refinery, which is being repaired after having suffered damage in a hurricane. Conferences are conducted by the laptops over packet switched Internet links to the corporation's videoconferencing gateway. The need to bring the refinery back on line quickly is a high priority for the corporation. Some way needs to be available to preferentially allocate, on a temporary basis, network resources for such a high priority project, but without preempting urgent, ad hoc conferences such as would be required for responding to the disaster on the oil drilling platform.

SUMMARY

Method, system, and computer program product example embodiments of the invention are disclosed to manage multiple operating modes in a video conferencing network under which different sets of policies can operate. The invention provides a situational bandwidth allocation capability to enable a person in control of an entire enterprise network to shift the network's bandwidth to key areas based on specific situations, such as emergency, stress, or disaster.

The system is a network management server, also referred to herein as the ELASTIC GATEKEEPER™, which includes a Conference Management System, which selectively implements one or more different sets of operating policies. A policy is a set of rules, algorithms or parameters that are used to determine how the Conference Management System treats requests for system resources. The Conference Management System is a set of hardware and software that allows conferences to be scheduled in advance, and tracks conference resource usage for items such as rooms, codecs and network bandwidth. In preferred implementations, it also sets up conferences and monitors on-going conferences. Its traditional functions are extended here to allow it to participate with a gatekeeper function to also provide management of Ad Hoc Conferences.

The Conference Management System is integrated and linked with a gatekeeper, which is responsible for setting up calls that are using end point alias addresses. The gatekeeper works with the Conference Management System to control access to network resources. Upon receiving a request to access a call, the gatekeeper passes the request to the Conference Management System for its approval. The Conference Management System has access to a robust set of policies, a detailed description of the network resources, and an awareness of the current System Operational Mode upon which to base a decision about the conditions and resources that can be granted to the requested call.

The network management server method prioritizes endpoints and/or users to ensure that system resources are allocated to the most important usage in the case of restricted resources.

The method allows the specification of multiple operating modes under which different sets of policies can operate. The modes specify the system conditions under which the call processing algorithms are operating. Normal Mode, Alert Mode, and Other Mode are considered, and these can be generalized to a plurality of Operational Mode Levels, where each mode has its own set of policies.

In the Normal Operation Mode, normal day-to-day operations are conducted and there is a set of policies that is applicable to this mode. For example, it is a typical policy for this mode that, all other issues being equal, scheduled conferences will have priority over ad hoc conferences. Scheduled Conferences are scheduled prior to the time that it is to occur. Ad Hoc Conferences are not scheduled prior to the time that the conference is initiated.

In the Alert Mode, a second set of policies is to be followed under conditions of emergency, stress, or disaster where network traffic is expected to be high, but the importance of ad hoc conferences is also increased. In general, this mode is configured to ensure that the maximum number of conferences can be supported and that high priority sites are assured of getting enough bandwidth to accomplish their mission. An event that could trigger an Alert Mode in the government realm would be a terror event, a major environmental or weather related event or a major accident.

In the Other Mode, a third set of policies is to be followed under conditions, for example, where there is a temporary, but high priority project that requires preferential allocation of network resources, but without preempting urgent, ad hoc conferences dealing with emergency, stress, or disaster.

The example method includes the step of selecting a normal mode policy establishing a corresponding normal operational mode for the conferencing network, wherein scheduled conferences have priority over ad hoc conferences. Then the method performs the step of processing network descriptions based on the normal mode policy to determine allowed responses to requests to establish scheduled conferences and ad hoc conferences. When there is a change in conditions, such as the occurrence of an emergency, stress, or disaster, the method then performs the step of selecting an alert mode policy establishing a corresponding alert operational mode for the conferencing network, wherein a reduced priority is given to scheduled conferences and network resources are allocated based on assigned priorities of end points. The method then performs the step of processing network descriptions based on the alert mode policy to determine allowed responses to requests to establish scheduled conferences and ad hoc conferences.

In the Alert Mode, the method operates on existing (in-process) scheduled conferences to either reduce their usage of network resources or to terminate the scheduled conferences in order to make room for higher priority ad hoc conferences.

The resulting network management server provides preferential allocation of network resources for requesting ad hoc videoconferencing sessions under conditions of emergency, stress, or disaster. It further provides preferential allocation, on a temporary basis, of network resources for a high priority project, but without preempting urgent, ad hoc conferences.

DESCRIPTION OF THE FIGURES

Example embodiments of the invention are shown in the accompanying figures.

DISCUSSION OF EXAMPLE EMBODIMENTS OF THE INVENTION

Figure 1:
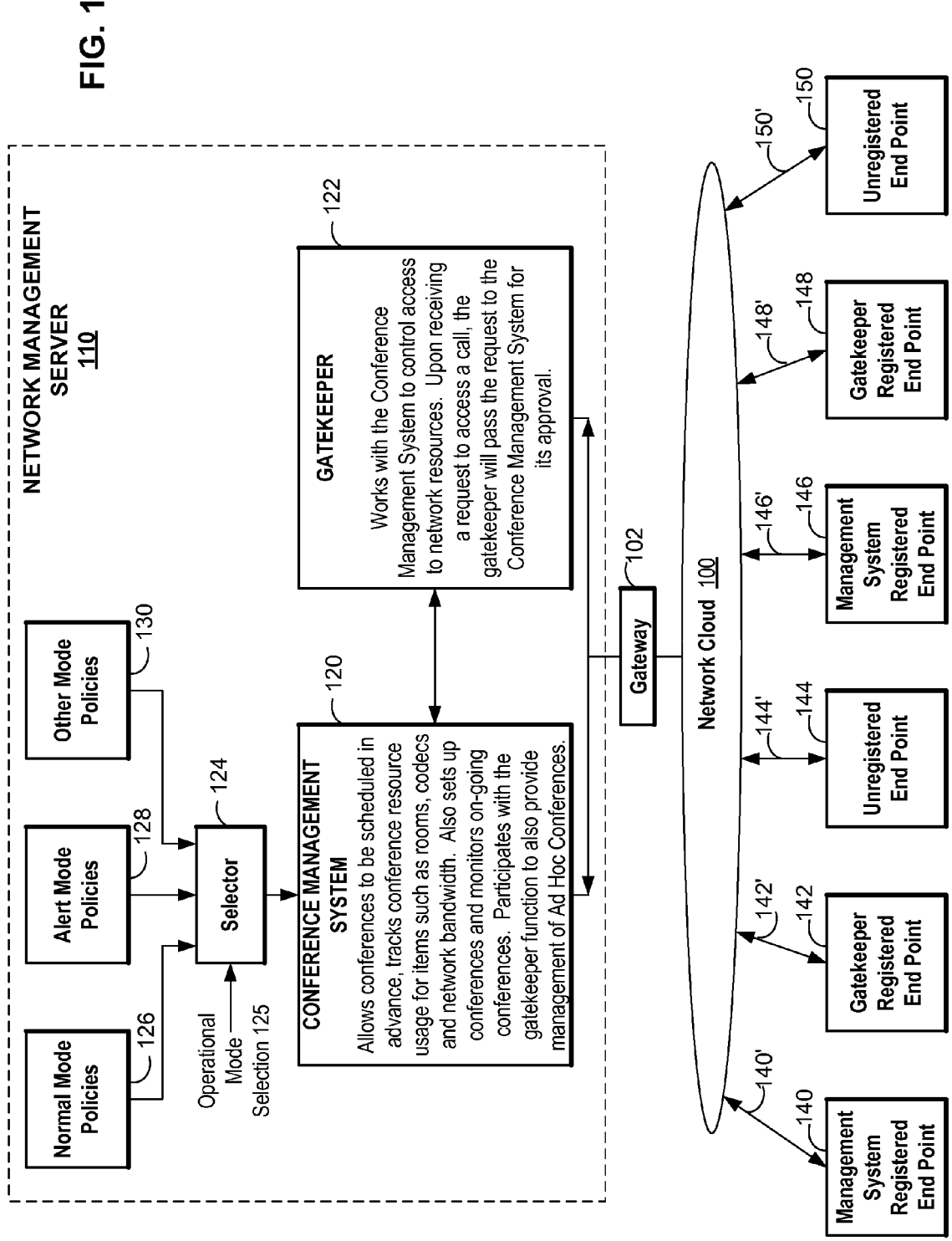
FIG. 1 is an example network diagram showing the network management server managing a plurality of videoconferencing end points in a network by selectively using multiple operating modes under which different sets of policies can operate.

FIG. 1 is a network diagram showing an example of a network management server 110, also referred to herein as the ELASTIC GATEKEEPER™, managing a plurality of videoconferencing end points in a network by selectively using multiple operating modes under which different sets of policies can operate. The network cloud 100 includes a variety of circuit switched and packet switched links between a plurality of videoconferencing end points and between those nodes and the gateway 102.

Three types of example endpoints are shown in FIG. 1: a Management System Registered End Point 140 and 146, a Gatekeeper Registered End Point 142 and 148, and an Unregistered End Point 144 and 150. A Management System Registered End Point is an end point that is registered in the management system. Some information will be known about this device, such as its manufacturer and model and bandwidth. This information may be entered manually or may be "discovered". A Gatekeeper Registered End Point can register with gatekeepers in accordance with industry standards, such as the H.323 Packet-Based Multimedia Communications Systems standard for multimedia communications, approved by the International Telecommunication Union (ITU). An Unregistered End Point is an end point that is not registered in the management system. All end points must be registered to participate in a scheduled conference. A policy will determine the disposition of an end point that is attempting to participate in an Ad Hoc Conference.

An example Gateway 102 connects the network cloud 100 with the network management server 110 and allows traffic into or out of the managed network. The gateway may allow Unregistered End Points to participate in conferences internal to the network.

The network management server 110 includes the example Conference Management System 120, which selectively implements one or more different sets of operating policies. A policy is a set of rules, algorithms or parameters that are used to determine how the Conference Management System treats requests for system resources. The Conference Management System is a set of hardware and software that allows conferences to be scheduled in advance, and tracks conference resource usage for items such as rooms, codecs and network bandwidth. In preferred implementations, it also sets up conferences and monitors on-going conferences. Its traditional functions are extended here to allow it to participate with a gatekeeper function to also provide management of Ad Hoc Conferences.

The Conference Management System is integrated and linked with the example gatekeeper 122, which is responsible for setting up calls that are using end point alias addresses. The gatekeeper 122 can include, for example, the functions specified for a gatekeeper in the H.323 Packet-Based Multimedia Communications Systems standard, including address translation, admission control, bandwidth control, zone management, call-control signaling, call authorization, and call management. The current version of the H.323 standard, commonly referred to as "H.323v6", published in 2006, is incorporated herein by reference for its description of example functions that can be performed by the example gatekeeper 122.

The gatekeeper 122 works with the Conference Management System 120 to control access to network resources. Upon receiving a request to access a call, the gatekeeper 122 passes the request to the Conference Management System 120 for its approval. The Conference Management System has access to a robust set of policies, a detailed description of the network resources, and an awareness of the current System Operational Mode upon which to base a decision about the conditions and resources that can be granted to the requested call.

The System Operational Mode is selected by the selector 124, based on the operational mode selection 125. The operational mode selection 125 may be input from a central source of an organization, such as the chief information officer or director of emergency preparedness, for example, or it may be input from decentralized sources, such as manually by a site manager or automatically, such as from an automatic fire detector. The modes specify the system conditions under which the call processing algorithms are operating. Either Normal Mode 126, Alert Mode 128, or an example Other Mode 130 can be considered. These modes can be generalized to a plurality of Operational Mode Levels, each mode having its own set of policies.

In an example Normal Operation Mode 126, scheduled conferences have priority over unscheduled conferences when they are of the same priority level. The Normal Operation Mode is accomplished by scheduling conferences through the conference management system 120. This mode is called the Managed Mode or Scheduled Mode. It can determine if system resources are being exceeded. It includes the ability to model the user's network and specify the available bandwidth that is available at each end point and along each network segment. If all of the requested and implied resources are available at the time of the conference request, the conference is granted and the conference is placed in the schedule. If another conference is requested that needs some of the resources already allocated to the scheduled conference, that requested conference is denied. The requester of the conference must either find another time or another set of resources for their conference when the necessary resources are available or must contact the person responsible for scheduling the first conference and request them (or possibly "order" them) to re-schedule their conference. The requests are made in advance and there is time to respond to conflicts in advance of the actual need for the conference, on a "first come—first serve" basis. While the "first come—first serve" method could give resources to low priority conferences and therefore block a high priority conference, the time is generally available to correct the problem. The management system generally sets up the conference for the users when the time for a scheduled conference arrives. The system continues to monitor the conference during the scheduled period and react to connection problems that might occur during the conference. In the example Normal Mode 126, Ad Hoc Conferences or Unmanaged Ad Hoc Conferences are only given network resources if they are available after allocating resources to the scheduled conferences. An Ad Hoc Conference is a conference that was not scheduled prior to the time that the conference is initiated and does not directly make use of the Conference Management System in any way to establish a conference. For example, an ad hoc conference is started by "dialing" the IP address of another end point.

In an example Alert Mode 128, no priority is given to scheduled conferences, but resources are allocated purely based on the priority assigned to the end points. In the Alert Mode 128, a second set of policies is to be followed under conditions of emergency, stress, or disaster where network traffic is expected to be high, but the importance of ad hoc conferences is also increased. In general, this mode is configured to ensure that the maximum number of conferences can be supported and that high priority sites are assured of getting enough bandwidth to accomplish their mission. An event that could trigger an Alert Mode in the government realm would be a terror event, a major environmental or weather related event or a major accident.

In an example Other Mode 130, a third set of policies is to be followed under conditions, for example, where there is a temporary, but high priority project that requires preferential allocation of network resources, but without preempting urgent, ad hoc conferences dealing with emergency, stress, or disaster.

Figure 2A:
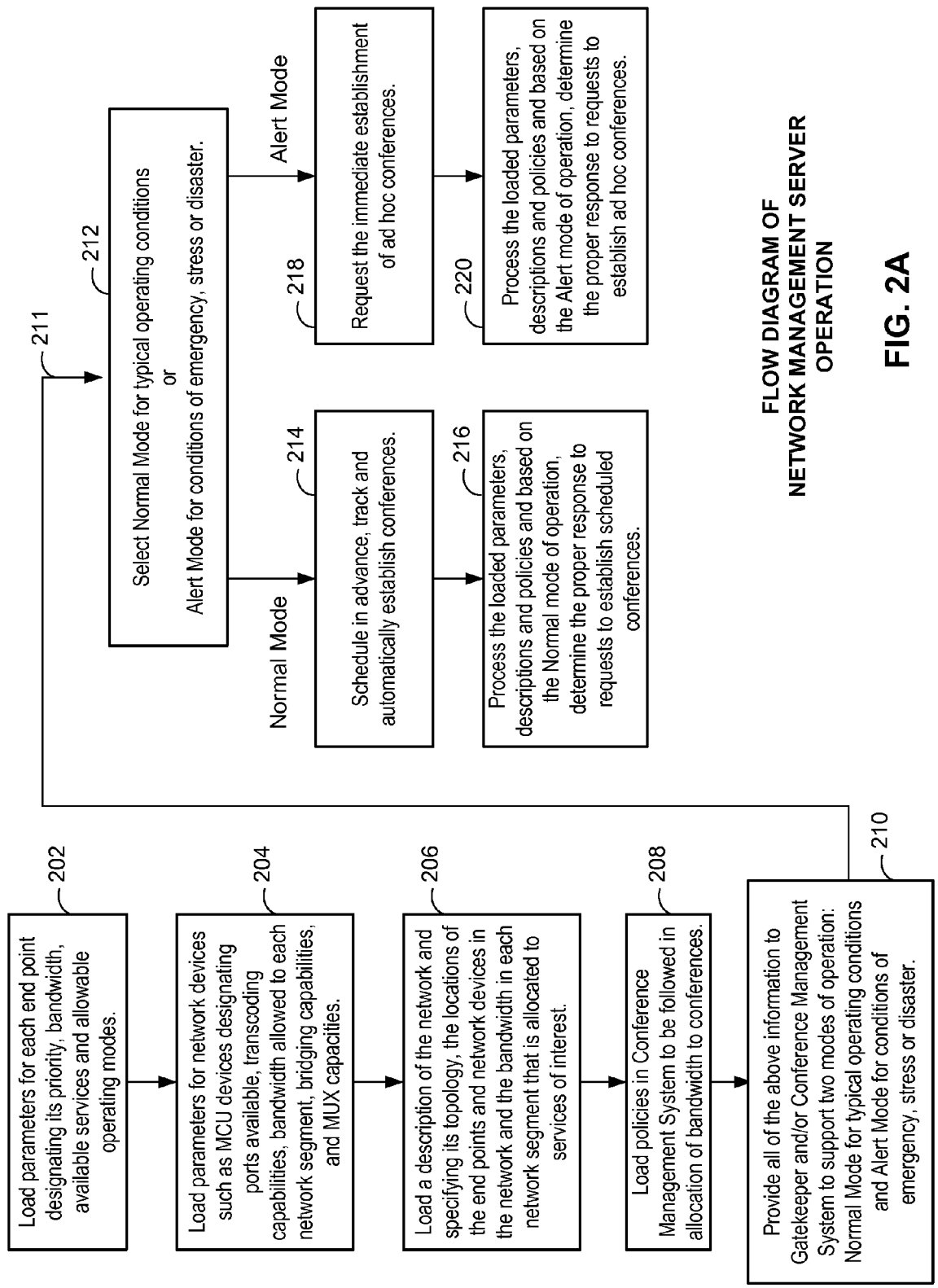
FIG. 2A is an example flow diagram of the operation of the network management server, selectively using two operating modes, Normal Mode and Alert Mode.

FIG. 2A is an example flow diagram of the operation of the network management server 110, selectively using two operating modes, Normal Mode 126 and Alert Mode 128. The method represented by the flow diagram of FIG. 2A includes the following steps:

Step 202: Loading parameters for each end point designating its priority, bandwidth, available services and allowable operating modes.

Step 204: Loading parameters for network devices such as MCU devices designating ports available, transcoding capabilities, bandwidth allowed to each network segment, bridging capabilities, and MUX capacities.

Step 206: Loading a description of the network and specifying its topology, the locations of the end points and network devices in the network and the bandwidth in each network segment that is allocated to services of interest.

Step 208: Loading policies for Normal Mode 126 and Alert Mode 128 to be followed in the allocation of bandwidth to conferences.

Step 210: Providing all of the above information in a manner to support two modes of operation, Normal Mode 126 and Alert Mode 128. The Normal Mode 126 being operated under typical operating conditions and the Alert Mode 128 being operated under conditions of emergency, stress or disaster. Step 210 flows on path 211 to step 212.

Step 212: Selecting the Normal mode of operation or the Alert mode of operation.

Steps 214 and 216 are for the Normal Mode 126.

Step 214: Schedule in advance, track and automatically establish conferences.

Step 216: Process the loaded parameters, descriptions and policies and based on the Normal mode of operation, determine the proper response to requests to establish scheduled conferences.

Steps 218 and 220 are for the Alert Mode 128.

Step 218: Request the immediate establishment of ad hoc conferences.

Step 220: Process the loaded parameters, descriptions and policies and based on the Alert mode of operation, determine the proper response to requests to establish ad hoc conferences.

Figure 2B:
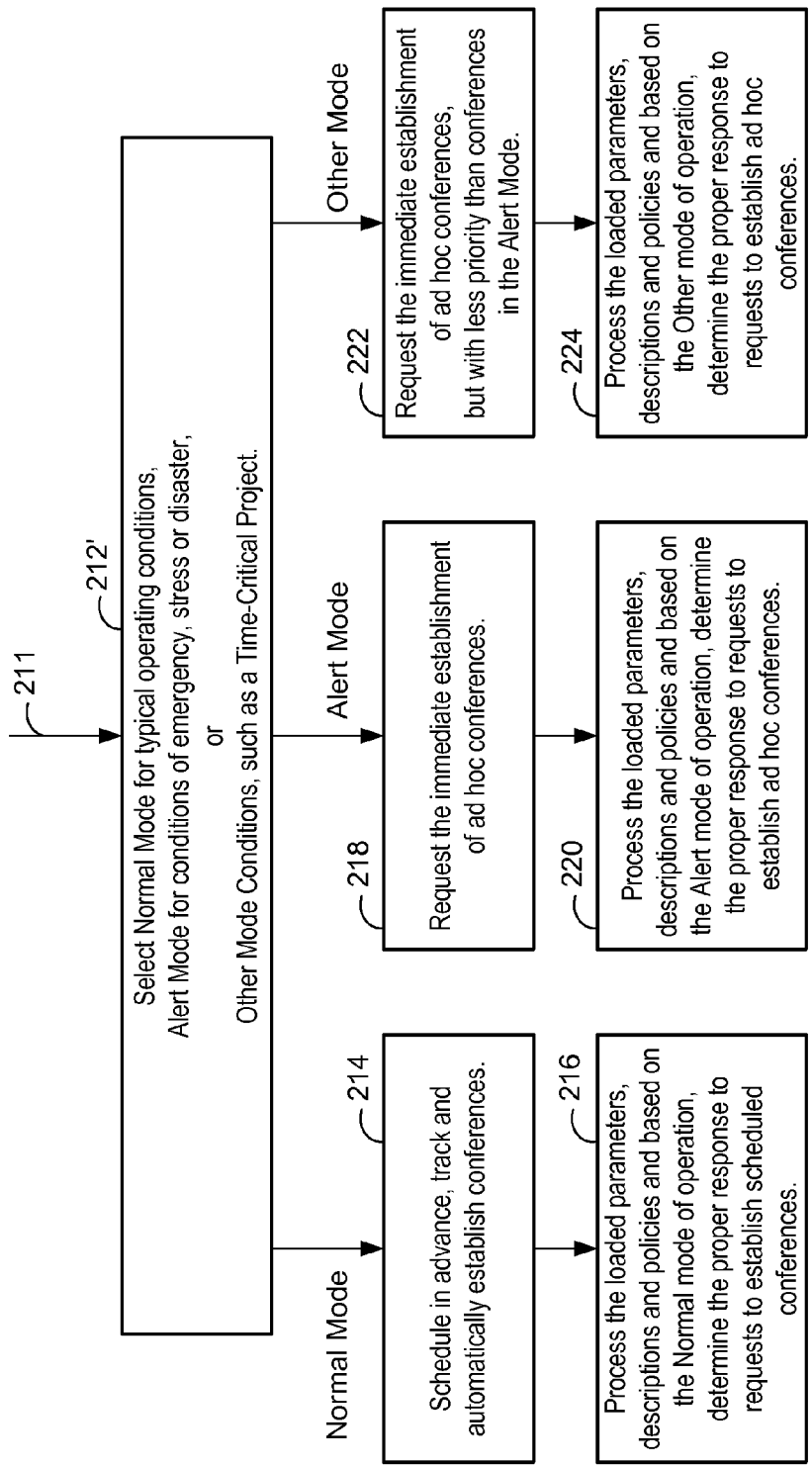
FIG. 2B is an example flow diagram of the operation of the network management server, selectively using three operating modes, Normal Mode, Alert Mode, and an example Other Mode.

FIG. 2B is an example flow diagram of the operation of the network management server, selectively using three operating modes, Normal Mode, Alert Mode, and an example Other Mode.

Step 210 of FIG. 2A flows on path 211 to step 212' of FIG. 2B.

Step 212': Selecting the Normal mode of operation, the Alert mode of operation, or the example Other mode of operation.

Steps 222 and 224 are for the example Other Mode 130.

Step 222: Request the immediate establishment of ad hoc conferences, but with less priority than conferences in the Alert Mode.

Step 224: Process the loaded parameters, descriptions and policies and based on the Other mode of operation, determine the proper response to requests to establish ad hoc conferences.

Figure 3:
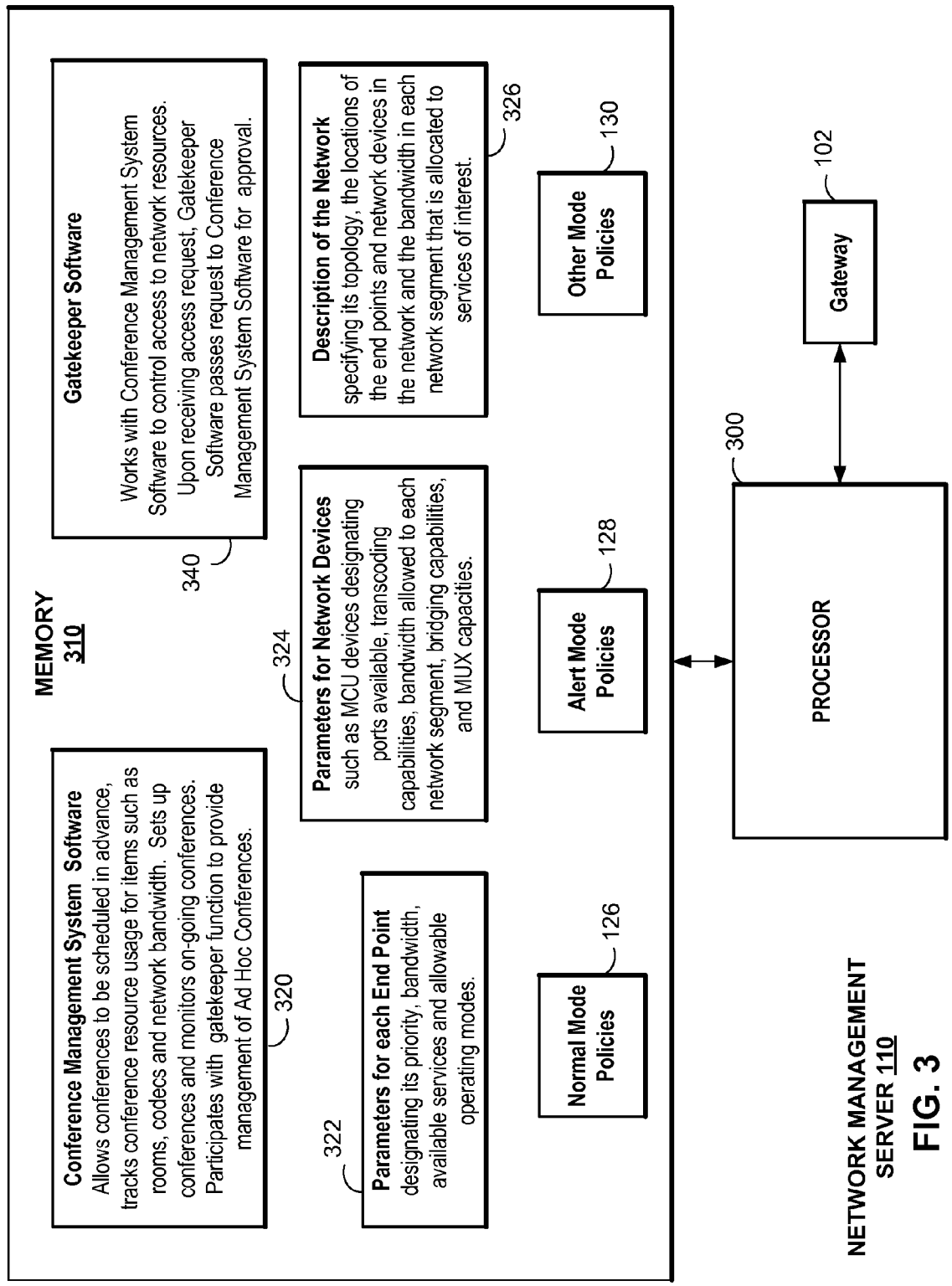
FIG. 3 is an example functional block diagram of the network management server.

FIG. 3 is an example functional block diagram of the network management server 110. The network management server 110 can include the computer processor 300 connected to the gateway 102 and the memory 310. The processor 300 is shown as a single processing engine, but it may be embodied as a plurality of processors in a distributed processing system. The memory 310 stores the Conference Management System Software 320, which allows conferences to be scheduled in advance, tracks conference resource usage for items such as rooms, codecs and network bandwidth. The Conference Management System Software 320 sets up conferences and monitors on-going conferences. The Conference Management System Software 320 participates with gatekeeper function to provide management of Ad Hoc Conferences.

The memory 310 stores the Gatekeeper Software 340, which works with Conference Management System Software 320 to control access to network resources. Upon receiving access request, Gatekeeper Software 340 passes request to Conference Management System Software 320 for approval.

The Conference Management System Software 320 and the Gatekeeper Software 340 are computer programs including sequences of executable instructions, which when executed by the processor 300, carry out the functions of the network management server 110.

The memory 310 stores the Parameters 322 for each End Point designating its priority, bandwidth, available services and allowable operating modes. It stores Parameters 324 for Network Devices such as MCU devices designating ports available, transcoding capabilities, bandwidth allowed to each network segment, bridging capabilities, and MUX capacities. It stores the Description 326 of the Network specifying its topology, the locations of the end points and network devices in the network and the bandwidth in each network segment that is allocated to services of interest.

The memory 310 stores the Normal Mode policies 126, Alert Mode policies 128, and the example Other Mode policies 130. The memory 310 is shown as a single storage module, but it may be embodied as a plurality of distributed storage modules in a storage array.

In operation, the example Conference Management System Software 320 allows conferences to be scheduled in advance, tracks conference resource usage for items such as rooms, codecs and network bandwidth. In preferred implementations, it also sets up conferences and monitors on-going conferences. Its traditional functions are extended here to allow it to participate with a gatekeeper function to also provide management of Ad Hoc Conferences. The example Gatekeeper Software 340 works with the Conference Management System Software 320 to control access to network resources. Upon receiving a request to access a call, the Gatekeeper Software 340 passes the request to the Conference Management System Software 320 for its approval.

The resulting network management server 110 provides a situational bandwidth allocation capability to enable a person in control of an entire enterprise network to shift the network's bandwidth to key areas based on specific situations, such as emergency, stress, or disaster. It can provide preferential allocation of network resources for requesting ad hoc videoconferencing sessions under such conditions as emergency, stress, or disaster. It can further provide preferential allocation, on a temporary basis, network resources for a high priority project, but without preempting urgent, ad hoc conferences.

Figure 4:
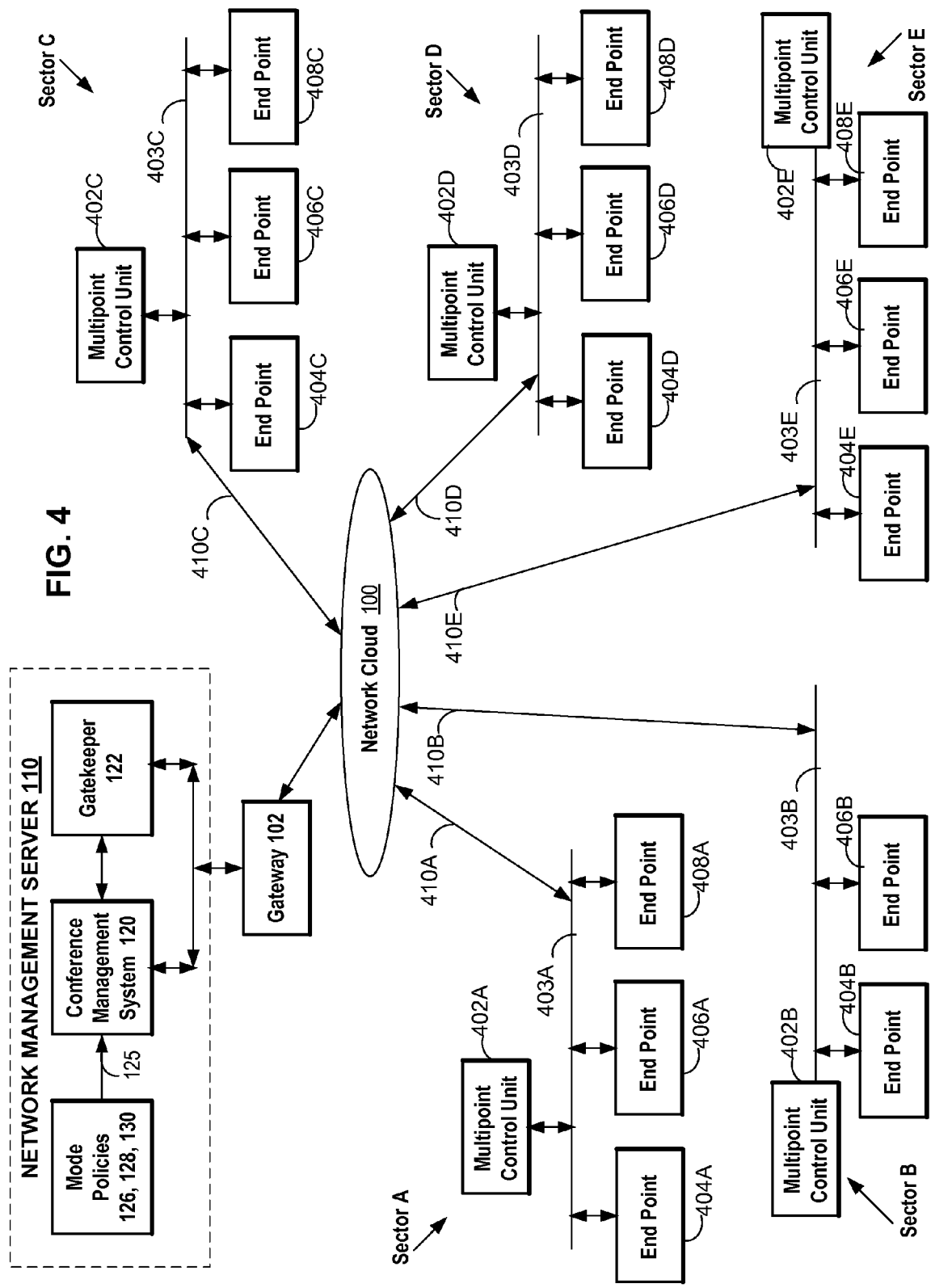
FIG. 4 is a network diagram of an example conferencing network operating under the control of the network management server.

An example conferencing network operating under the control of the network management server 110, is shown in FIG. 4. The network management server 110 manages the videoconferencing network by selectively using a Normal Mode policy 126 or an Alert Mode policy 128. The gateway 102 connects the network management server 110 to the network cloud 100, which includes a variety of circuit switched and packet switched links to a plurality of videoconferencing end points. The videoconferencing network of FIG. 4 includes a plurality of example sector networks A, B, C, D, and E, each respectively connected to the network cloud 100 by a respective link 410A, 410B, 410C, 410D, and 410E, which can range from packet switched Internet links to dedicated, circuit switched trunks that may include international links through undersea fiber optical cables or leased transponders of a communications satellite.

Each example network sector A, B, C, D, and E of FIG. 4 includes a respective Multipoint Control Unit (MCU) 402A, 402B, 402C, 402D, and 402E, connected over the respective sector network 403A, 403B, 403C, 403D, and 403E to the respective videoconferencing endpoints 404A, 406B, and 408C, etc. The MCUs distribute a presenters or speaker's input at a first end point to the output ports representing the other participants at other endpoints either in the same sector or in other sectors in FIG. 4. The gatekeeper 122 provides the functions of address translation, admissions control, and bandwidth control for endpoints and MCUs located in each sector A, B, C, D, and E. Under control of the network management server 110 operating under the current mode policy 126, 128, or 130, the MCUs and endpoint components in the sectors A, B, C, D, and E are allocated bandwidths to meet the current situation of normalcy, emergency, stress, or disaster.

Example Operation of an Embodiment of the Invention

Figure 5A:
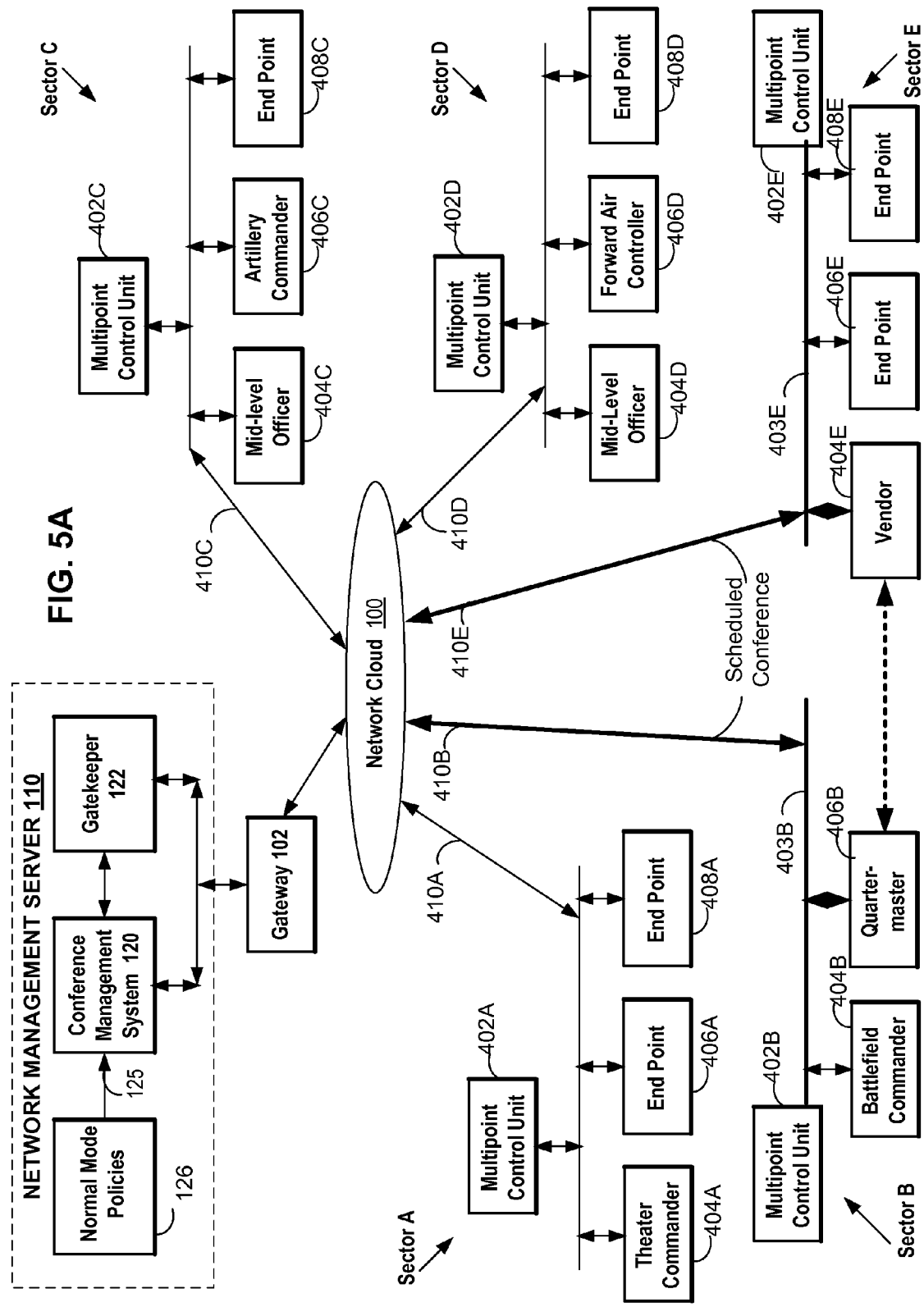
FIG. 5A is a network diagram of the example conferencing network of FIG. 4, operating in a Normal Operation Mode.
Figure 5B:
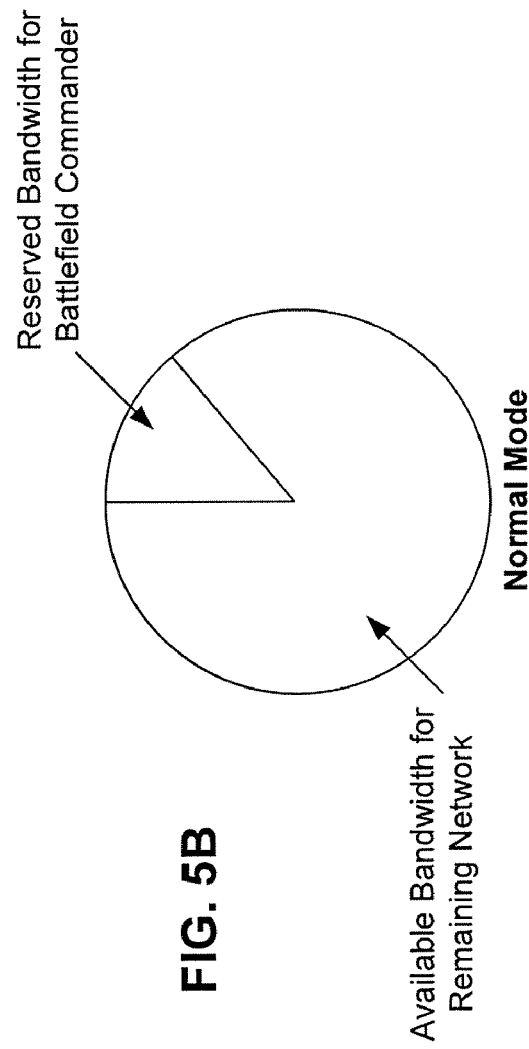
FIG. 5B is a pie-chart showing an example allocation of bandwidth for the example conferencing network of FIG. 5A, operating in a Normal Operation Mode.

An example operation of the method can be applied in the area of warfare. FIG. 5A is a network diagram of the example conferencing network of FIG. 4, operating in a Normal Operation Mode in a warfare scenario. Assume that a war theater commander at endpoint 404A uses the videoconferencing network of FIG. 5A to conduct strategy meetings with subordinate commanders, using videoconference rooms designed for high quality-of-service communication and equipped with high definition displays requiring a high bandwidth. The war theater commander's scheduled conferences are assigned a high priority in the Normal Operation Mode. A permanent network policy gives the war theater commander ultimate control of the operating policies of the network, designating how the Normal Mode, Alert Mode, and Other Mode operating policies shall allocate network bandwidth under various conditions. The war theater commander has a situational bandwidth allocation capability, enabling him to control the entire enterprise network to shift the network's bandwidth to key areas based on specific situations. The war theater commander can delegate control of the operating policies for certain sectors of the network and can delegate the control for invoking the Normal Mode, Alert Mode, or Other Mode policies for certain sectors. In this example, the war theater commander at 404A delegates control of the operating policies within a battlefield sector of the network to a battlefield commander at endpoint 404B and delegates to the battlefield commander the control for invoking the Normal Mode, Alert Mode, or Other Mode policies for the battlefield sector. FIG. 5B is a pie-chart showing an example allocation of bandwidth for the example conferencing network of FIG. 5A, operating in a Normal Operation Mode.

The same videoconferencing network of FIG. 5A is also used for tactical meetings between the battlefield commander at 404B and other mid-level officers at endpoints 404C and 404D in the same war theater, using moderately sophisticated videoconference rooms designed for an intermediate quality-of-service communication and equipped with intermediate definition displays requiring an intermediate level bandwidth. The mid-level officer's scheduled conferences are assigned an intermediate priority in the Normal Operation Mode.

The same videoconferencing network of FIG. 5A is also used for scheduled conferences between the Quartermaster at endpoint 406B in the same war theater and an outside vendor at endpoint 404E, using the moderately sophisticated videoconference rooms. The Quartermaster's scheduled conferences are assigned an intermediate priority in the Normal Operation Mode, with the outside vendor.

Finally, the same videoconferencing network of FIG. 5A is also used for ad hoc battle communications between the battle commander at 404B, other line officers at 404C and 404D, an artillery commander at 406C and a forward air controller at 406D, where conditions of emergency, stress, or disaster exist and where network traffic is expected to be high, but the importance of ad hoc conferences is also increased. The artillery commander at 406C and a forward air controller at 406D use limited bandwidth laptop computers connected over communications satellite transponders to the network's videoconferencing gateway.

Because multiple videoconferencing sessions are conducted simultaneously over the network, the network management server 110 is used to allocate the finite available bandwidth of the network's segments and to allocate the conferencing end points among the requesting videoconferencing sessions.

Two operating policies are loaded into the network management server 110, a Normal Mode policy 126 and an Alert Mode policy 128.

An example Normal Mode policy 126 is shown in Table 1. Table 1 has columns for end point, enterprise control, delegated control, reserved bandwidth, and ad hoc priority. The rows in Table 1 identify each of the end point nodes in FIG. 5A. For example, the end point 404A for the theater commander, is specified as having the overall network control, a reserved bandwidth of 10%, and an ad hoc priority that is below all scheduled sessions and with a 1st come/1st served priority for ad hoc sessions. The end point 404B for the battlefield commander, is specified as having delegated control in the battlefield sector, a reserved bandwidth of 10%, and an ad hoc priority that is below all scheduled sessions and with a 1st come/1st served priority for ad hoc sessions. The end point 406B for the quartermaster, is specified as having a reserved bandwidth of 2%, and an ad hoc priority that is below all scheduled sessions and with a 1st come/1st served priority for ad hoc sessions.

The Normal Mode policy 126 is invoked when normal day-to-day operations are conducted that are not battlefield operations requiring battlefield communications. For example, it is a typical policy for this mode that, all other issues being equal, scheduled conferences between the Quartermaster at 406B and the vendor at 404E will have priority over ad hoc conferences.

Figure 6B:
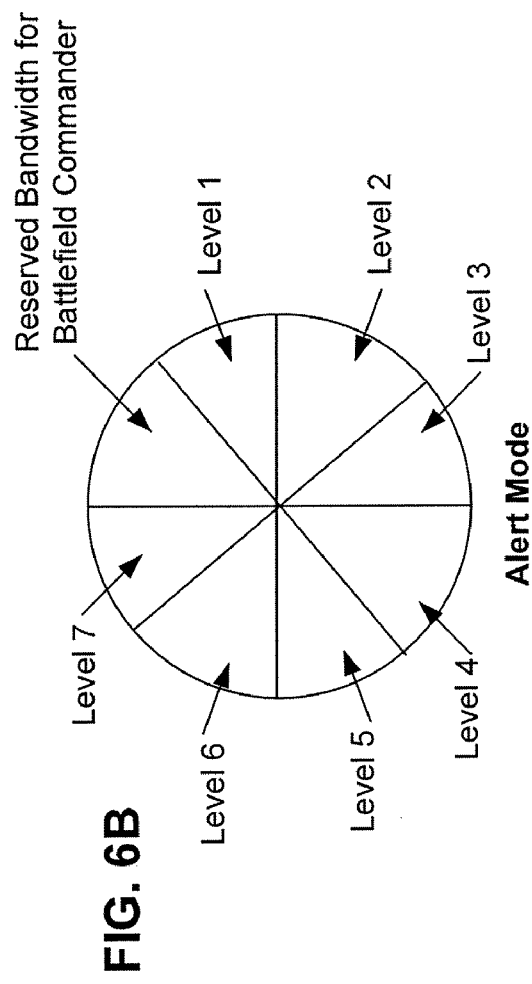
FIG. 6B is a pie-chart showing an example allocation of bandwidth for the example conferencing network of FIG. 6A, operating in a Alert Operation Mode.

An example Alert Mode policy 128 is shown in Table 2. Table 2 has columns for end point, enterprise control, delegated control, reserved bandwidth, and ad hoc priority. The rows in Table 2 identify each of the end point nodes in FIG. 6A. For example, the end point 404A for the theater commander, is specified as having the overall network control, a reserved bandwidth of 10%, and an ad hoc priority that is not greater than 10% or only as the battlefield commander at end point 404B allows for ad hoc sessions. The end point 404B for the battlefield commander, is specified as having delegated control in the battlefield sector, an on demand reserved bandwidth of up to 85%, and a maximum ad hoc priority. The on demand reserved bandwidth enables the battlefield commander to select the level of bandwidth necessary to respond to the situation. FIG. 6B shows that each level increases the amount of dedicated bandwidth reserved for the commander's use during the Alert Mode. The end point 406B for the quartermaster, is specified as having a reserved bandwidth of 1%, and an ad hoc priority that is not greater than 1% or only as the battlefield commander at end point 404B allows for ad hoc sessions.

The Alert Mode policy 128 is invoked for battlefield operations where battlefield communications are conducted over the network. Under these conditions network traffic is expected to be high, but the importance of ad hoc conferences is also increased. In general, this mode is configured to ensure that the maximum number of conferences can be supported and that high priority sites are assured of getting enough bandwidth to accomplish their mission.

In FIG. 5A, when there are no battlefield conditions, the normal mode policy 126 is selected for the network management server 110 establishing a corresponding normal operational mode for the conferencing network, wherein scheduled conferences between the Quartermaster at 406B and the vendor at 404E have priority over ad hoc conferences. The method performs the step of processing network descriptions based on the normal mode policy 126 to determine allowed responses to requests to establish scheduled conferences and ad hoc conferences. The scheduled conferences between the Quartermaster at 406B and the vendor at 404E are granted the network resources they need before any resources are granted to ad hoc conferences.

The network management server 110, operating under the Normal Mode policy 126 for the Quartermaster's scheduled conference in FIG. 5A, assigns network bandwidth from the Quartermaster's endpoint 406B, over the B sector network 403B, over the network link 410B, through the network cloud 100, over the network link 410E, over the E sector network 403E, to the Vendor's endpoint 404E. The Quartermaster's scheduled conference is assigned the bandwidth it needs over the B sector network 403B and over the network link 410B, before any ad hoc conferences can be assigned whatever bandwidth is left over for these links. In alternate scenarios, the Normal Mode policy can be configured to specify a higher priority for ad hoc conferences conducted by the battlefield commander.

Figure 6A:
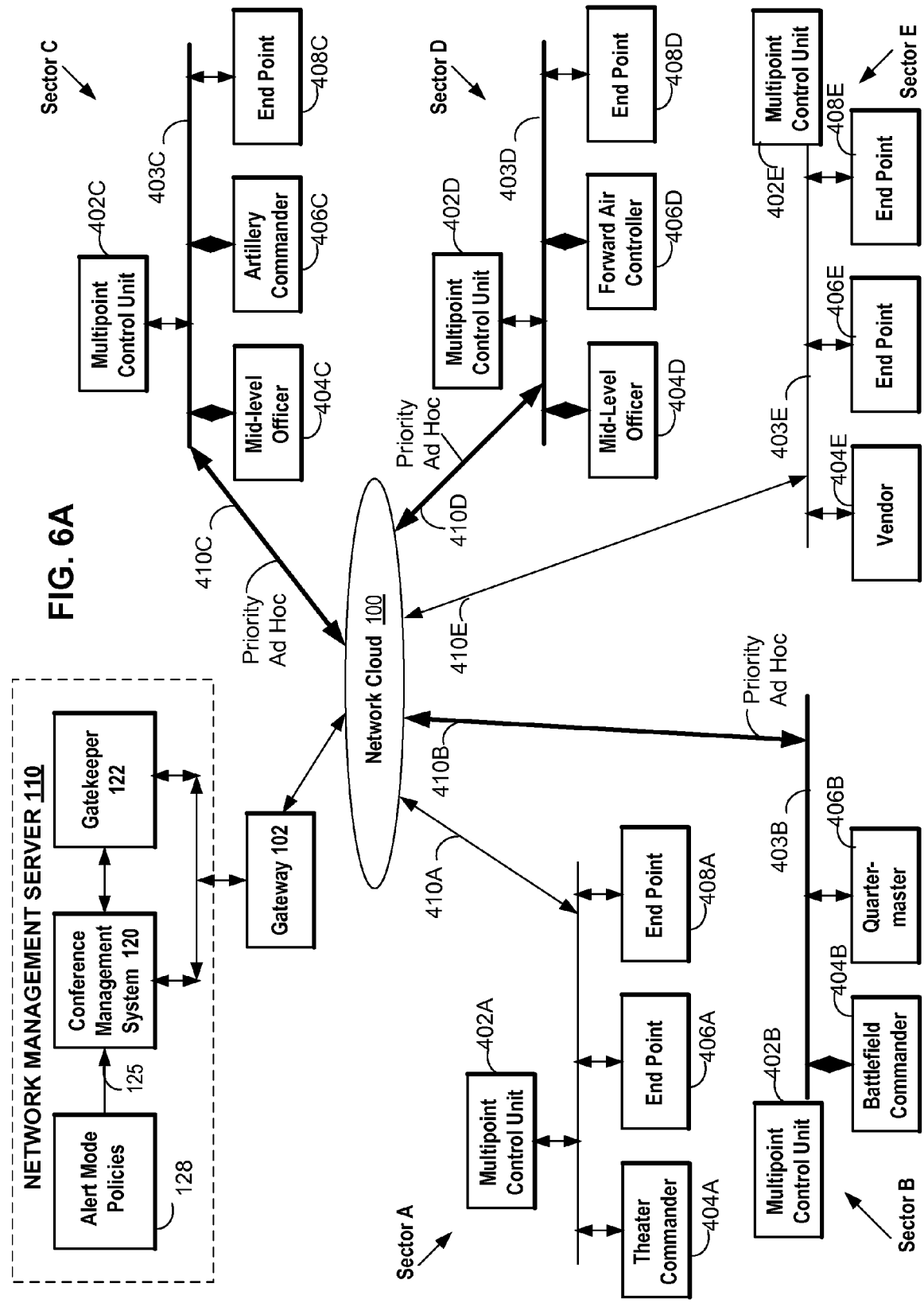
FIG. 6A is a network diagram of the example conferencing network of FIG. 4, operating in an Alert Operation Mode.

In FIG. 6A, when the theater commander at 404A has delegated to the battlefield commander at 404B the control for invoking the Normal Mode, Alert Mode, or Other Mode policies for the battlefield sector, the battlefield commander at 404B is enabled to invoke a change in the operating mode by sending a prearranged control signal to the network management server 110. When battlefield conditions are planned or experienced, the battlefield commander at 404B sends a mode switching signal over the network, or via another network, to the operational mode selection input 125 of the selector 124 of the network management server 110, to change the operating policy to the Alert Mode policy 128.

FIG. 6B is a pie-chart showing an example allocation of bandwidth for the example conferencing network of FIG. 6A, operating in a Alert Operation Mode. The battlefield commander can select the level of bandwidth necessary to respond to the situation. Each level increases the amount of dedicated bandwidth reserved for the commander's use during the Alert Mode.

The method performs the step of selecting the Alert Mode policy establishing a corresponding alert operational mode for the conferencing network of FIG. 6A, wherein a reduced priority is given to scheduled conferences between the Quartermaster at 406B and the vendor at 404E and the network resources are allocated to the ad hoc battle communications between the battlefield commander at 404B, line officers at 404C and 404D, the artillery commander at 406C and the forward air controller at 406D in the battlefield sector. The battlefield commander at 404B, line officers at 404C and 404D, the artillery commander at 406C and the forward air controller at 406D in the battlefield sector are granted all of the network resources they need. The method performs the step of processing network descriptions based on the Alert Mode policy to determine allowed responses to requests to establish scheduled conferences and ad hoc conferences.

The network management server 110, operating under the Alert Mode policy 128 for the Battlefield Commander's ad hoc conference in FIG. 6A, assigns network bandwidth on a higher priority basis from the Battlefield Commander's endpoint 404B, over the B sector network 403B, over the network link 410B, through the network cloud 100, to the line officers at 404C and 404D, the artillery commander at 406C and the forward air controller at 406D in the battlefield sector, who are granted all of the network resources they need for their high priority ad hoc conference. The Quartermaster's scheduled conference will only be assigned network bandwidth if it is available during the Alert Mode.

TABLE 1

| EXAMPLE NORMAL MODE POLICY 126 (for FIGS. 5A & 5B) | | | | |
|---|---|---|---|---|
| END POINT | ENTERPRISE CONTROL | DELEGATED CONTROL | RESERVED BANDWIDTH | AD HOC PRIORITY |
| 404A THEATER COMMANDER | OVERALL NETWORK CONTROL | | 10% | BELOW ALL SCHEDULED $1^{ST}$ COME $1^{ST}$ SERVED |
| 406A | | | | |
| 408A | | | | |
| 404B BATTLEFIELD COMMANDER | | BATTLEFIELD SECTOR | 10% | BELOW ALL SCHEDULED $1^{ST}$ COME $1^{ST}$ SERVED |
| 406B Q'MASTER | | | 2% | BELOW ALL SCHEDULED $1^{ST}$ COME $1^{ST}$ SERVED |
| 404C MID-LEVEL OFFICER | | | 5% | BELOW ALL SCHEDULED $1^{ST}$ COME $1^{ST}$ SERVED |
| 406C ARTILLERY COMMANDER | | | 5% | BELOW ALL SCHEDULED $1^{ST}$ COME $1^{ST}$ SERVED |
| 408C | | | | |
| 404D MID-LEVEL OFFICER | | | 5% | BELOW ALL SCHEDULED $1^{ST}$ COME $1^{ST}$ SERVED |
| 406D FORWARD AIR CNTL | | | | BELOW ALL SCHEDULED $1^{ST}$ COME $1^{ST}$ SERVED |
| 408D | | | | |
| 404E VENDOR | | | 2% | BELOW ALL SCHEDULED $1^{ST}$ COME $1^{ST}$ SERVED |
| 406E | | | | |
| 408E | | | | |

TABLE 2

EXAMPLE ALERT MODE POLICY 128 (for FIG. 6A & 6B)

| END POINT | ENTERPRISE CONTROL | DELEGATED CONTROL | RESERVED BANDWIDTH | AD HOC PRIORITY |
|---|---|---|---|---|
| 404A THEATER COMMANDER 406A 408A | OVERALL NETWORK CONTROL | | 10% | NOT >10% OR ONLY AS 404B ALLOWS |
| 404B BATTLEFIELD COMMANDER | | BATTLEFIELD SECTOR CONTROL | ON DEMAND UP TO 85% | MAXIMUM |
| 406B Q'MASTER | | | 1% | NOT >1% OR ONLY AS 404B ALLOWS |
| 404C MID-LEVEL OFFICER | | | 1% | NOT >1% OR ONLY AS 404B ALLOWS |
| 406C ARTILLERY COMMANDER 408C | | | 1% | NOT >1% OR ONLY AS 404B ALLOWS |
| 404D MID-LEVEL OFFICER | | | 1% | NOT >1% OR ONLY AS 404B ALLOWS |
| 406D FORWARD AIR CNTL 408D | | | 1% | NOT >1% OR ONLY AS 404B ALLOWS |
| 404E VENDOR 406E 408E | | | | |

CONCLUSION

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

The resulting invention provides a situational bandwidth allocation capability to enable a person in control of an entire enterprise network to shift the network's bandwidth to key areas based on specific situations, such as emergency, stress, or disaster.

Although example embodiments of the invention have been disclosed, a person skilled in the art will understand that changes can be made to the example embodiments without departing from the spirit and scope of the invention.

What is claimed is:

1. An apparatus, comprising:

a conference management system configured to provide situational bandwidth allocation capability by selectively implementing a selected one of a plurality of different operating policies establishing a corresponding one of a plurality of operational modes to shift allocation of the network's bandwidth from a normal bandwidth allocation under normal conditions to an allocation of bandwidth to assigned endpoints of the network under conditions of emergency, stress, or disaster; and a gatekeeper coupled to the conference management system, configured to set up calls in said network, the gatekeeper upon receiving a call requesting access to a conference in the network, configured to pass the request to the conference management system for its approval before completing setting up the call;

said plurality of operating policies including a normal mode policy establishing a corresponding normal operational mode having a normal bandwidth allocation in the network and an alert mode policy establishing a corresponding alert operational mode having an allocation of bandwidth to assigned endpoints of the network under conditions of emergency, stress, or disaster;

said conference management system configured to select the normal mode policy establishing the corresponding normal operational mode for the network, wherein scheduled conferences have priority over ad hoc conferences;

said conference management system configured to select the alert mode policy establishing the corresponding alert operational mode for the network, wherein a reduced priority is given to scheduled conferences and network resources are allocated based on priorities of network end points assigned by the alert mode policy;

said conference management system configured to execute said selected one of said plurality of operating policies, to process a description of network resources and current operational mode and to decide what resources can be granted to said request.

2. The apparatus of claim 1, which further comprises:
said conference being a video, audio, or collaboration conference.

3. The apparatus of claim 1, which further comprises:
said normal mode policy being associated with normal day-to-day operations where scheduled conferences will have priority over ad hoc conferences.

4. The apparatus of claim 1, which further comprises:
said alert mode policy being associated with conditions of emergency, stress, or disaster where network traffic is expected to be high, but the importance of ad hoc conferences is also increased.

5. The apparatus of claim 1, which further comprises:
said plurality of operating policies further including an other mode policy establishing a corresponding other operational mode;
said other mode policy being associated with conditions where there is a temporary, but high priority project that requires preferential allocation of network resources, but without preempting urgent, ad hoc conferences dealing with emergency, stress, or disaster.

6. The apparatus of claim 1, which further comprises:
said conference management system operating on in-process conferences to either reduce their usage of network resources or to terminate the conference in order to make room for higher priority conferences.

7. The apparatus of claim 1, which further comprises:
said conference management system operating under an alert mode policy establishing a corresponding alert operational mode, providing preferential allocation of network resources for requesting ad hoc videoconferencing sessions under conditions of emergency, stress, or disaster.

8. The apparatus of claim 1, which further comprises:
said conference management system operating under an other mode policy establishing a corresponding other operational mode, providing, on a temporary basis, network resources for a high priority project, but without preempting urgent, ad hoc conferences.

9. A method, comprising:
selecting a normal mode policy in a network management server, establishing a corresponding normal operational mode for a conferencing network, wherein scheduled conferences have priority over ad hoc conferences;
processing network descriptions in the network management server, based on said normal mode policy to determine allowed responses to requests to establish scheduled conferences and ad hoc conferences;
selecting an alert mode policy in the network management server, establishing a corresponding alert operational mode for a conferencing network, wherein a reduced priority is given to scheduled conferences and network resources are allocated based on assigned priorities of end points; and
processing network descriptions in the network management server, based on said alert mode policy to determine allowed responses to requests to establish scheduled conferences and ad hoc conferences.

10. The method of claim 9, which further comprises:
prioritizing in the network management server, end-points and/or users in the network to ensure that system resources are allocated to most important usages when network resources are limited.

11. The method of claim 9, which further comprises:
operating in the network management server, on in-process conferences to either reduce their usage of network resources or to terminate the in-process conference in order to make room for higher priority conferences.

12. A non-transitory computer readable medium storing computer executable program code, comprising:
computer executable program code in said medium for selecting a normal mode policy in a network management server, establishing a corresponding normal operational mode for a conferencing network, wherein scheduled conferences have priority over ad hoc conferences;
computer executable program code in said medium for processing network descriptions in the network management server, based on said normal mode policy to determine allowed responses to requests to establish scheduled conferences and ad hoc conferences;
computer executable program code in said medium for selecting an alert mode policy in the network management server, establishing a corresponding alert operational mode for a conferencing network, wherein a reduced priority is given to scheduled conferences and network resources are allocated based on assigned priorities of end points; and
computer executable program code in said medium for processing network descriptions in the network management server, based on said alert mode policy to determine allowed responses to requests to establish scheduled conferences and ad hoc conferences.

13. A method for flexibly allocating network bandwidth for scheduled and ad hoc conferences, comprising:
loading parameters in a network management server, for each end point in a network, designating its priority, bandwidth, available services and allowable operating modes;
loading parameters in the network management server, for network devices designating ports available and allowed bandwidth to each network segment;
loading a description in the network management server, of the network and the bandwidth in each network segment that is allocated to services of interest;
loading a plurality of policies in the network management server, to be followed in allocating bandwidth to conferences, to support a plurality of modes of operation, including a normal mode policy establishing a normal mode operated under normal operating conditions and an alert mode policy establishing an alert mode operated under conditions of emergency, stress or disaster;
selecting in the network management server, the normal mode policy for the normal mode of operation or the alert mode policy for the alert mode of operation;
scheduling in the network management server, conferences in the normal mode of operation in response to the normal mode policy; and
requesting in the network management server, immediate establishment of ad hoc conferences in the alert mode of operation in response to the alert mode policy.

14. A non-transitory computer readable medium storing computer executable program code for flexibly allocating network bandwidth for scheduled and ad hoc conferences, comprising:
computer executable program code in said medium for loading parameters in a network management server, for each end point in a network, designating its priority, bandwidth, available services and allowable operating modes;

computer executable program code in said medium for loading parameters in the network management server, for network devices designating ports available and allowed bandwidth to each network segment;

computer executable program code in said medium for loading a description in the network management server, of the network and the bandwidth in each network segment that is allocated to services of interest;

computer executable program code in said medium for loading a plurality of policies in the network management server, to be followed in allocating bandwidth to conferences, to support a plurality of modes of operation, including a normal mode policy establishing a normal mode operated under normal operating conditions and an alert mode policy establishing an alert mode operated under conditions of emergency, stress or disaster;

computer executable program code in said medium for selecting in the network management server, the normal mode policy for the normal mode of operation or the alert mode policy for the alert mode of operation;

computer executable program code in said medium for scheduling in the network management server, conferences in the normal mode of operation in response to the normal mode policy; and computer executable program code in said medium for requesting in the network management server, immediate establishment of ad hoc conferences in the alert mode of operation in response to the alert mode policy.

15. The apparatus of claim 1, which further comprises:
said alert mode policy specifying a first end point in the network having overall network control and selectively able to delegate control in a specified network sector to a second end point in the network.

16. The apparatus of claim 1, which further comprises:
said alert mode policy specifying a first end point in the network having on demand reserved bandwidth and able to select levels of bandwidth necessary to communicate with a second end point in the network.

17. The method of claim 9, which further comprises:
said alert mode policy specifying a first end point in the network having overall network control and selectively able to delegate control in a specified network sector to a second end point in the network.

18. The method of claim 9, which further comprises:
said alert mode policy specifying a first end point in the network having on demand reserved bandwidth and able to select levels of bandwidth necessary to communicate with a second end point in the network.

19. The computer readable medium of claim 12, which further comprises:
said alert mode policy specifying a first end point in the network having overall network control and selectively able to delegate control in a specified network sector to a second end point in the network.

20. The computer readable medium of claim 12, which further comprises:
said alert mode policy specifying a first end point in the network having on demand reserved bandwidth and able to select levels of bandwidth necessary to communicate with a second end point in the network.

21. An apparatus, comprising:
a conference management system configured to provide situational bandwidth allocation capability by selectively implementing a selected one of a plurality of different operating policies establishing a corresponding one of a plurality of operational modes to shift allocation of the network's bandwidth from a normal bandwidth allocation under normal conditions to a preferential allocation of network resources to assigned endpoints of the network under conditions where there is a temporary, but high priority project that requires preferential allocation of network resources; and a gatekeeper coupled to the conference management system, configured to set up calls in said network, the gatekeeper upon receiving a call requesting access to a conference in the network, configured to pass the request to the conference management system for its approval before completing setting up the call;

said plurality of operating policies including a normal mode policy establishing a corresponding normal operational mode having a normal bandwidth allocation in the network and an other mode policy establishing a corresponding other operational mode having a preferential allocation of network resources;

said conference management system configured to select the normal mode policy establishing the corresponding normal operational mode for the network, wherein scheduled conferences have priority over ad hoc conferences;

said conference management system configured to select the other mode policy establishing the corresponding other operational mode for the network, wherein a preferential allocation of network resources enables an immediate establishment of ad hoc conferences for assigned endpoints of the network under conditions where there is a temporary, but high priority project that requires preferential allocation of the network resources;

said conference management system configured to execute said selected one of said plurality of operating policies, to process a description of network resources and current operational mode and to decide what resources can be granted to said request.

22. The apparatus of claim 21, which further comprises:
said conference being a video, audio, or collaboration conference.

23. The apparatus of claim 21, which further comprises:
said normal mode policy being associated with normal day-to-day operations where scheduled conferences will have priority over ad hoc conferences.

24. The apparatus of claim 21, which further comprises:
said other mode policy being associated with conditions where there is a temporary, but high priority project that requires preferential allocation of network resources, but without preempting urgent, ad hoc conferences dealing with emergency, stress, or disaster.

25. The apparatus of claim 21, which further comprises:
said conference management system operating on in-process conferences to either reduce their usage of network resources or to terminate the conference in order to make room for higher priority conferences.

26. A method, comprising:
selecting a normal mode policy in a network management server, establishing a corresponding normal operational mode for a conferencing network, wherein scheduled conferences have priority over ad hoc conferences;

processing network descriptions in the network management server, based on said normal mode policy to determine allowed responses to requests to establish scheduled conferences and ad hoc conferences;

selecting an other mode policy in the network management server, establishing a corresponding other operational mode for the conferencing network, wherein a preferential allocation of network resources enables an immediate establishment of ad hoc conferences for assigned endpoints of the network under conditions where there is a temporary, but high priority project that requires preferential allocation of the network resources; and processing network descriptions in the network management server, based on said other mode policy to determine allowed responses to requests to establish scheduled conferences and ad hoc conferences.

27. The method of claim 26, which further comprises:
prioritizing in the network management server, end-points and/or users in the network to ensure that system resources are allocated to most important usages when network resources are limited.

28. The method of claim 26, which further comprises:
operating in the network management server, on in-process conferences to either reduce their usage of network resources or to terminate the in-process conference in order to make room for higher priority conferences.

29. A non-transitory computer readable medium storing computer executable program code, comprising:
computer executable program code in said medium for selecting a normal mode policy in a network management server, establishing a corresponding normal operational mode for a conferencing network, wherein scheduled conferences have priority over ad hoc conferences;
computer executable program code in said medium for processing network descriptions in the network management server, based on said normal mode policy to determine allowed responses to requests to establish scheduled conferences and ad hoc conferences;
computer executable program code in said medium for selecting an other mode policy in the network management server, establishing a corresponding other operational mode for the conferencing network, wherein a preferential allocation of network resources enables an immediate establishment of ad hoc conferences for assigned endpoints of the network under conditions where there is a temporary, but high priority project that requires preferential allocation of the network resources; and
computer executable program code in said medium for processing network descriptions in the network management server, based on said other mode policy to determine allowed responses to requests to establish scheduled conferences and ad hoc conferences.

30. A method for flexibly allocating network bandwidth for scheduled and ad hoc conferences, comprising:
loading parameters in a network management server, for each end point in a network, designating its priority, bandwidth, available services and allowable operating modes;
loading parameters in the network management server, for network devices designating ports available and allowed bandwidth to each network segment;
loading a description in the network management server, of the network and the bandwidth in each network segment that is allocated to services of interest;
loading a plurality of policies in the network management server, to be followed in allocating bandwidth to conferences, to support a plurality of modes of operation, including a normal mode policy establishing a normal mode operated under normal operating conditions and an other mode policy establishing a corresponding other operational mode for the conferencing network, wherein a preferential allocation of network resources enables an immediate establishment of ad hoc conferences for assigned endpoints of the network under conditions where there is a temporary, but high priority project that requires preferential allocation of the network resources;
selecting in the network management server, the normal mode policy for the normal mode of operation or the other mode policy for the other mode of operation;
scheduling in the network management server, conferences in the normal mode of operation in response to the normal mode policy; and
requesting in the network management server, immediate establishment of ad hoc conferences in the other mode of operation in response to the other mode policy.

31. A non-transitory computer readable medium storing computer executable program code for flexibly allocating network bandwidth for scheduled and ad hoc conferences, comprising:
computer executable program code in said medium for loading parameters in a network management server, for each end point in a network, designating its priority, bandwidth, available services and allowable operating modes;
computer executable program code in said medium for loading parameters in the network management server, for network devices designating ports available and allowed bandwidth to each network segment;
computer executable program code in said medium for loading a description in the network management server, of the network and the bandwidth in each network segment that is allocated to services of interest;
computer executable program code in said medium for loading a plurality of policies in the network management server, to be followed in allocating bandwidth to conferences, to support a plurality of modes of operation, including a normal mode policy establishing a normal mode operated under normal operating conditions and an other mode policy establishing a corresponding other operational mode for the conferencing network, wherein a preferential allocation of network resources enables an immediate establishment of ad hoc conferences for assigned endpoints of the network under conditions where there is a temporary, but high priority project that requires preferential allocation of the network resources;
computer executable program code in said medium for selecting in the network management server, the normal mode policy for the normal mode of operation or the other mode policy for the other mode of operation;
computer executable program code in said medium for scheduling in the network management server, conferences in the normal mode of operation in response to the normal mode policy; and
computer executable program code in said medium for requesting in the network management server, immediate establishment of ad hoc conferences in the other mode of operation in response to the other mode policy.

* * * * *